US009513663B2

(12) United States Patent
Jones et al.

(10) Patent No.: US 9,513,663 B2
(45) Date of Patent: Dec. 6, 2016

(54) ELECTRONIC DEVICE WITH TOUCH SENSITIVE DISPLAY (71) Applicant: Apple Inc., Cupertino, CA (US)

(72) Inventors: Warren Z. Jones, San Jose, CA (US); Shayan Malek, San Jose, CA (US); Rasamy Phouthavong, Campbell, CA (US)

(73) Assignee: APPLE INC., Cupertino, CA (US)

( * ) Notice: Subject to any disclaimer, the term of this patent is extended or adjusted under 35 U.S.C. 154(b) by 301 days.

(21) Appl. No.: 13/855,426

(22) Filed: Apr. 2, 2013

(65) Prior Publication Data

US 2014/0293145 A1 Oct. 2, 2014

(51) Int. Cl.
*G06F 1/16* (2006.01)
*G06F 3/041* (2006.01)
*G06F 3/044* (2006.01)
*G06F 1/32* (2006.01)

(52) U.S. Cl.
CPC ........... *G06F 1/1626* (2013.01); *G06F 1/3262* (2013.01); *G06F 3/044* (2013.01); *G06F 3/0414* (2013.01); *G06F 3/0416* (2013.01); *G06F 2203/04103* (2013.01); *G06F 2203/04105* (2013.01); *G06F 2203/04106* (2013.01)

(58) Field of Classification Search
CPC ........ G06F 3/0414; G06F 3/044; G06F 3/043; G06F 3/0436; G06F 2203/04105; G06F 2203/04106; G06F 1/1626
See application file for complete search history.

(56) References Cited

U.S. PATENT DOCUMENTS

| 5,915,285 | A | * | 6/1999 | Sommer | 73/865.7 |
| 6,492,979 | B1 | | 12/2002 | Kent et al. | |
| 7,683,890 | B2 | | 3/2010 | Geaghan | |
| 8,605,055 | B2 | * | 12/2013 | Han | 345/174 |
| 2010/0128002 | A1 | * | 5/2010 | Stacy et al. | 345/174 |
| 2011/0141051 | A1 | | 6/2011 | Ryu | |
| 2011/0141052 | A1 | | 6/2011 | Bernstein et al. | |
| 2011/0255023 | A1 | * | 10/2011 | Doyle et al. | 349/58 |
| 2012/0098790 | A1 | | 4/2012 | Han | |
| 2012/0133594 | A1 | * | 5/2012 | Edwards | G06F 3/044 345/173 |
| 2013/0009905 | A1 | * | 1/2013 | Castillo et al. | 345/174 |
| 2013/0033450 | A1 | | 2/2013 | Coulson et al. | |

(Continued)

*Primary Examiner* — Quan-Zhen Wang
*Assistant Examiner* — Xuemei Zheng
(74) *Attorney, Agent, or Firm* — Brownstein Hyatt Farber Schreck, LLP (57) ABSTRACT An electronic device may be provided with a touch screen display. The touch screen display may have an array of display pixels that are used to display images for a user. Touch input to the touch screen display may be provided by a user's finger or other external object. A touch sensor in the display may have vertical and horizontal position sensors that are based on distinct touch sensor technologies. The position sensors may be based on strain gauge sensors or other force sensors, capacitive sensors having multiple elongated transparent capacitive electrodes that span the display, acoustic sensors, light-based sensors, and other types of sensors. An opaque masking layer in an inactive area of the display may hide some of the position sensor structures from view such as vertical position sensor structures. The horizontal position sensor structures may have minimal inactive regions along their edges.

21 Claims, 11 Drawing Sheets (56) References Cited

U.S. PATENT DOCUMENTS

2013/0080811 A1    3/2013  Low et al.
2014/0098058 A1*   4/2014  Baharav ................ G06F 3/0421
                                                            345/174
2014/0346029 A1*  11/2014  Sekizawa ................ G06F 3/044
                                                            200/600

* cited by examiner

ELECTRONIC DEVICE WITH TOUCH SENSITIVE DISPLAY

BACKGROUND

This relates generally to electronic devices and, more particularly, to electronic devices having touch sensors.

Electronic devices often include touch sensors. For example, cellular telephones often have displays that include capacitive touch sensors. The location of a user's finger or other external object on the display of a cellular telephone can be used to control the operation of the cellular telephone.

A typical capacitive touch sensor for a display has a two-dimensional array of capacitive touch sensor electrodes. The capacitive touch sensor electrodes can be formed from a material such as indium tin oxide that is both conductive and transparent. Signal lines formed from opaque metal traces run around the periphery of the array and are used to convey signals associated with the capacitive touch sensor electrodes.

The central portion of a display contains an array of display pixels for generating images and is sometimes referred to as the active area of the display. The touch sensor array overlaps the array of display pixels in the active area and gathers touch input. Inactive border regions surround the active area. To hide potentially unsightly display components such as the metal signal lines associated with the touch sensor array and display pixel array, the inactive border region can be covered by a bezel or an opaque masking layer such as a layer of black ink. If care is not taken, however, the width of inactive areas of a touch screen display may be considerable. Excessively large borders are generally not aesthetically pleasing and can lead to overly bulky devices.

It would therefore be desirable to be able to provide touch sensors for displays that help minimize the width of inactive borders.

SUMMARY

An electronic device may be provided with a touch screen display. The touch screen display may have an array of display pixels that are used to display images for a user. The touch screen display may also have a two-dimensional touch sensor. The two-dimensional touch sensor may be used to gather position information in connection with a touch event. The position information may include a position in a first lateral dimension and a position in a second lateral dimension that is perpendicular to the first lateral dimension. For example, the two-dimensional touch sensor may gather vertical and horizontal position information for each touch event.

Touch input to the touch screen display may be provided by a user's finger or other external object. The touch sensor in the display may have vertical and horizontal position sensors that are based on distinct touch sensor technologies. For example, the horizontal position sensor may be formed using a first touch technology and the vertical position sensor may be formed using a second touch technology.

The position sensors may be based on strain gauge sensors or other force sensors, capacitive sensors having multiple elongated transparent capacitive electrodes that span the display, acoustic sensors, light-based sensors, and other types of sensors. The capacitive electrodes may be formed directly on a display cover layer or may be formed on a clear substrate that is attached to the display cover layer with adhesive. The array of display pixels may form part of an organic light-emitting diode display structure or a liquid crystal display structure. The display structure may be attached to the touch sensor with a layer of adhesive.

An opaque masking layer in an inactive area of the display may hide some of the position sensor structures from view. For example, force sensor structures or other vertical position sensor structures may be formed on the underside of the opaque masking layer. The horizontal position sensor structures may have minimized inactive regions along their edges.

Further features of the invention, its nature and various advantages will be more apparent from the accompanying drawings and the following detailed description of the preferred embodiments.

DETAILED DESCRIPTION

An electronic device may be provided with electronic components such as touch screen displays that include touch sensors. A touch screen display has a display portion for presenting images to a user. The display portion, which may sometimes be referred to as a display module or display structures, may be based on liquid crystal display structures, organic light-emitting display structures, electrophoretic display structures, plasma display structures, or other display structures. The touch sensor portion of the touch screen may be formed from a two-dimensional touch sensor that can resolve the lateral position of an external object such as a user's finger or a stylus in vertical and horizontal dimensions (i.e., left-right and up-down on the face of the display as viewed by a user of the electronic device).

The touch sensor may be configured to reduce or eliminate structures on at least some of the borders of the touch sensor. For example, inactive border edges on the left and right (or on the top and bottom) of the touch sensor may be minimized. This may help reduce the inactive area of the touch screen display to provide an electronic device with enhanced aesthetics and a compact size.

Figure 1:
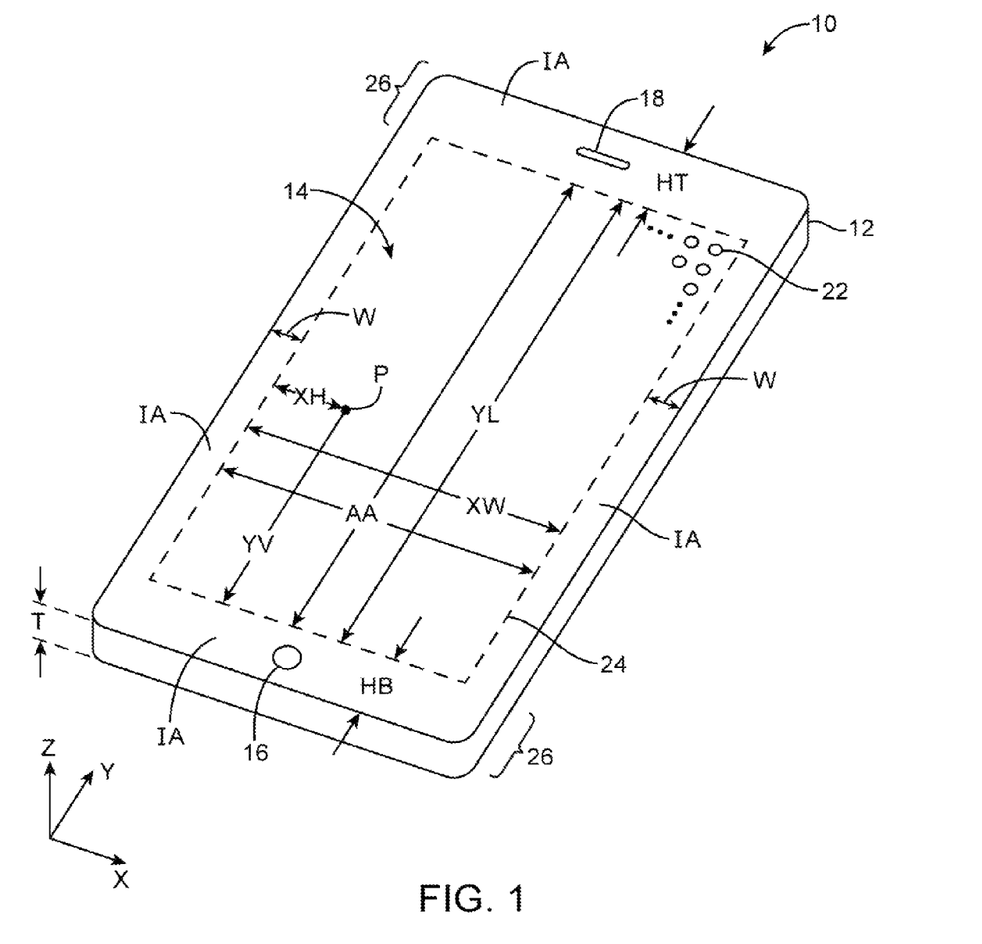
FIG. 1 is a perspective view of an illustrative electronic device with a touch screen display in accordance with an embodiment.

An illustrative electronic device that may be provided with a two-dimensional touch sensor such as a two-dimensional touch sensor that forms part of a touch screen display is shown in FIG. 1. Electronic devices such as device 10 of FIG. 1 may be cellular telephones, media players, other handheld portable devices, somewhat smaller portable devices such as wrist-watch devices, pendant devices, glasses, earpieces, or other wearable or miniature devices, gaming equipment, tablet computers, notebook computers, desktop computers, televisions, computer monitors, computers integrated into computer displays, or other electronic equipment.

As shown in the example of FIG. 1, device 10 may include a display such as display 14. Display 14 may be mounted in a housing such as housing 12. Housing 12 may have upper and lower portions joined by a hinge (e.g., in a laptop computer) or may form a structure without a hinge, as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display. A touch sensor in display 14 may be used to determine the horizontal and vertical position of an external object on the display. The external object may be a user's finger or other body parts, may be a stylus, or may be other external structures. Multitouch configurations may be used for the touch sensor that allow device 10 to accept multitouch input (i.e., input in which multiple points of contact are resolved simultaneously). With a multitouch touch screen display, a user can provide touch input in the form of two-finger commands, three-finger commands, and other multitouch commands. The use of a touch sensor in a display to measure the position of an external object such as a single one of a user's fingers is sometimes described herein as an example. This is merely illustrative. Device 10 may include any suitable type of two-dimensional touch sensor (e.g., a multitouch touch sensor that is capable of processing commands with one, two, or three touch locations, a multitouch touch sensor that is capable of processing commands with more than three touch contact points, a touch sensor that only resolves one touch point at a time, a touch sensor that is not part of a display, etc.).

The touch sensor used in device 10 may be based on capacitive touch sensor components, resistive touch sensor components, acoustic touch sensor components, force-based touch sensor components, light-based touch sensor components, or touch sensor components associated with other touch technologies. For example, the touch sensor may have capacitive touch sensor electrodes that are formed from an array of indium tin oxide structures or other transparent conductive structures. The touch sensor may also have touch sensor components formed from types of touch sensor technologies (e.g., force-based touch, resistive touch, etc.).

In some configurations, the touch sensor may have vertical position and horizontal position touch sensors that are each formed using a distinct touch technology. For example, the horizontal sensor in the touch sensor of display 14 may be formed using an array of capacitive touch sensor electrodes that is capable of gathering horizontal position data for touch events, whereas the vertical sensor in the touch sensor of display 14 may be a non-capacitive touch sensor that is formed using force sensors, resistive touch circuitry, or other non-capacitive touch sensor components (i.e., touch sensor components based on a touch technology that is distinct from the capacitive touch technology used for the capacitive touch sensor electrodes).

As shown in FIG. 1, display 14 may include an array of display pixels such as pixels 22. The array of display pixels may be used by display 14 to display images for a user of device 10. Display pixels 22 may be formed from liquid crystal display (LCD) components, an array of electrophoretic display pixels, an array of plasma display pixels, an array of organic light-emitting diode display pixels, an array of electrowetting display pixels, or display pixels based on other display technologies. The array of display pixels 22 in display 10 of FIG. 1 lies within a rectangular region bordered by dashed line 24. This region may sometimes be referred to as the active area AA of display 14. The active touch sensor components of the touch sensor in display 14 may be formed in active area AA to allow touch input capture in this region.

The rectangular ring-shaped region that surrounds the periphery of active area AA may not contain any active display pixels or touch sensor structures and may therefore sometimes be referred to as the inactive area IA or inactive region of display 14 and the inactive area IA or inactive region of the touch sensor portion of display 14.

A display cover layer or other display layers in display 14 may be covered with a bezel over inactive area IA or the display cover layer or other display layers in display 14 may be provided an opaque masking layer in inactive area IA to hide internal touch sensor and display pixel array components from view by a user. For example, an opaque masking layer that overlaps inactive border region IA of FIG. 1 may be used to hide metal traces from view. Openings may be formed in the opaque masking layer and display cover layer to accommodate components such as button 16 and speaker port 18 (as examples).

During operation of device 10, a user's finger or other external object may touch display 14. The touch sensor in display 14 may determine the position of the user's touch in horizontal dimension X and vertical dimension Y. For example, if an external object touches display 14 at point P, the touch sensor may determine that a touch event has occurred at horizontal location XH and vertical location YV).

Device 10 may be characterized by a thickness T in dimension Z. Active area AA may be characterized by a vertical size (length) YL in vertical dimension Y and a horizontal size (width) XW in horizontal dimension X. Inactive area IA may be characterized by a width HT at the top of display 14, a width HB at the bottom of display 14, and horizontal widths W along the right and left edges of display 14. Dimensions HT and HB may be large enough to accommodate components such as button 16 and speaker 18 (as an example).

To minimize the size of the border region of display 14 and thereby make device 10 compact and aesthetically pleasing, it may be desirable to minimize some or all of dimensions of inactive border IA. For example, by implementing the vertical position touch sensor portion of the touch sensor in display 14 using touch sensor structures that are located at end regions 26 of the touch sensor and active area AA, less room may be needed on the edges of the touch sensor for structures such as signal line traces than would otherwise be consumed. This may allow the size of the inactive portions of the touch sensor edges to be reduced or eliminated, reducing or eliminating the need for large inactive area widths W. With one suitable arrangement, the vertical position touch sensor structures in regions 26 are formed using a different type of touch technology than the horizontal sensor in display 14 (e.g., a touch sensor technology that is able to determine vertical position YV using structures that are located in regions 26).

Figure 2:
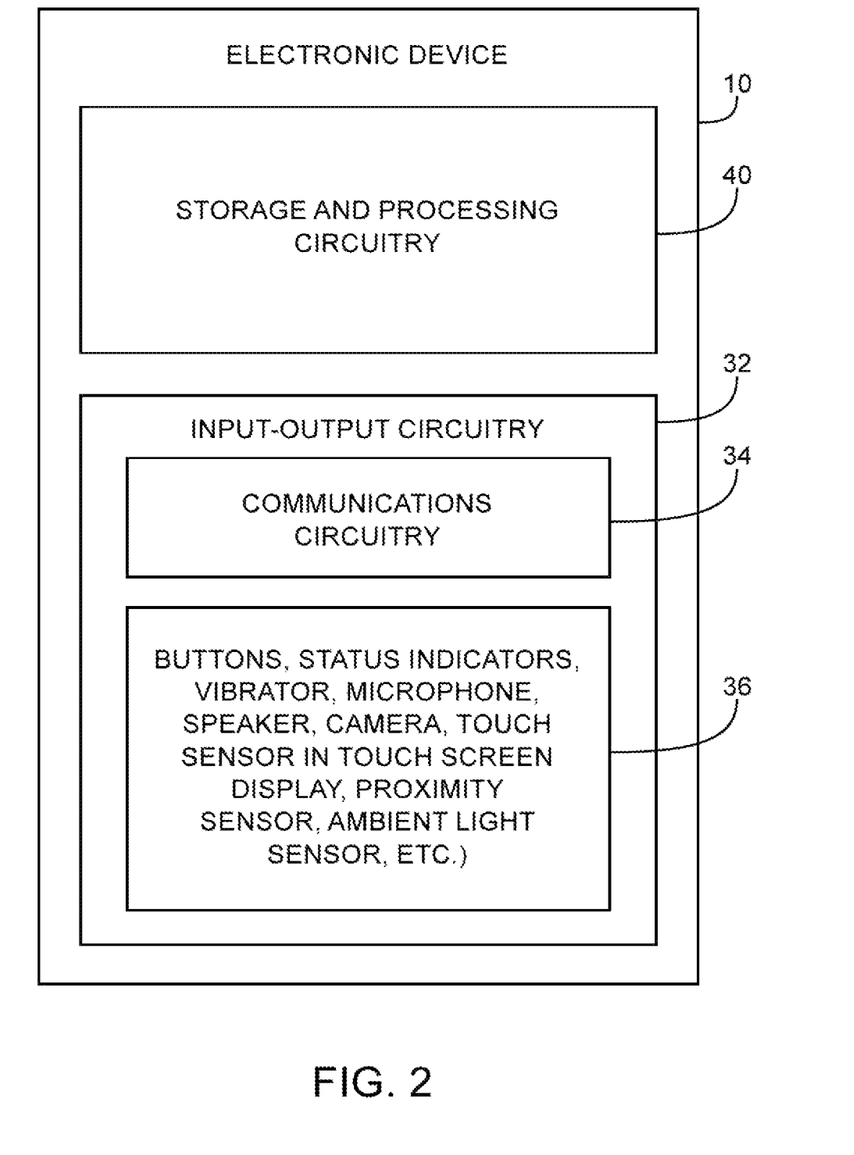
FIG. 2 is a schematic diagram of an illustrative electronic device with a touch screen display in accordance with an embodiment.

FIG. 2 is a schematic diagram of device 10 showing how device 10 may include a touch sensor for a touch screen display, other sensors, and other components. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor, one or more touch sensor signal processing integrated circuits, power management units, baseband processors, audio integrated circuits, communications circuits, and other suitable integrated circuits. With one suitable arrangement, storage and processing circuitry 40 may be used to run software on device 10, such as internet browsing applications, email applications, media playback applications, operating system functions, software for capturing and processing images, software implementing functions associated with gathering and processing sensor data such as touch sensor data, software that controls the sleep and wake states of device 10, software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, one or more displays such as display 14, a touch sensor such as a touch sensor in display 14, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, an ambient light sensor, a proximity sensor, a pressure sensor, a temperature sensor, an accelerometer, a gyroscope, and other circuitry for making measurements of the environment surrounding device 10, and other equipment for gathering input from a user or other external source and/or generating output for a user.

Figure 3:
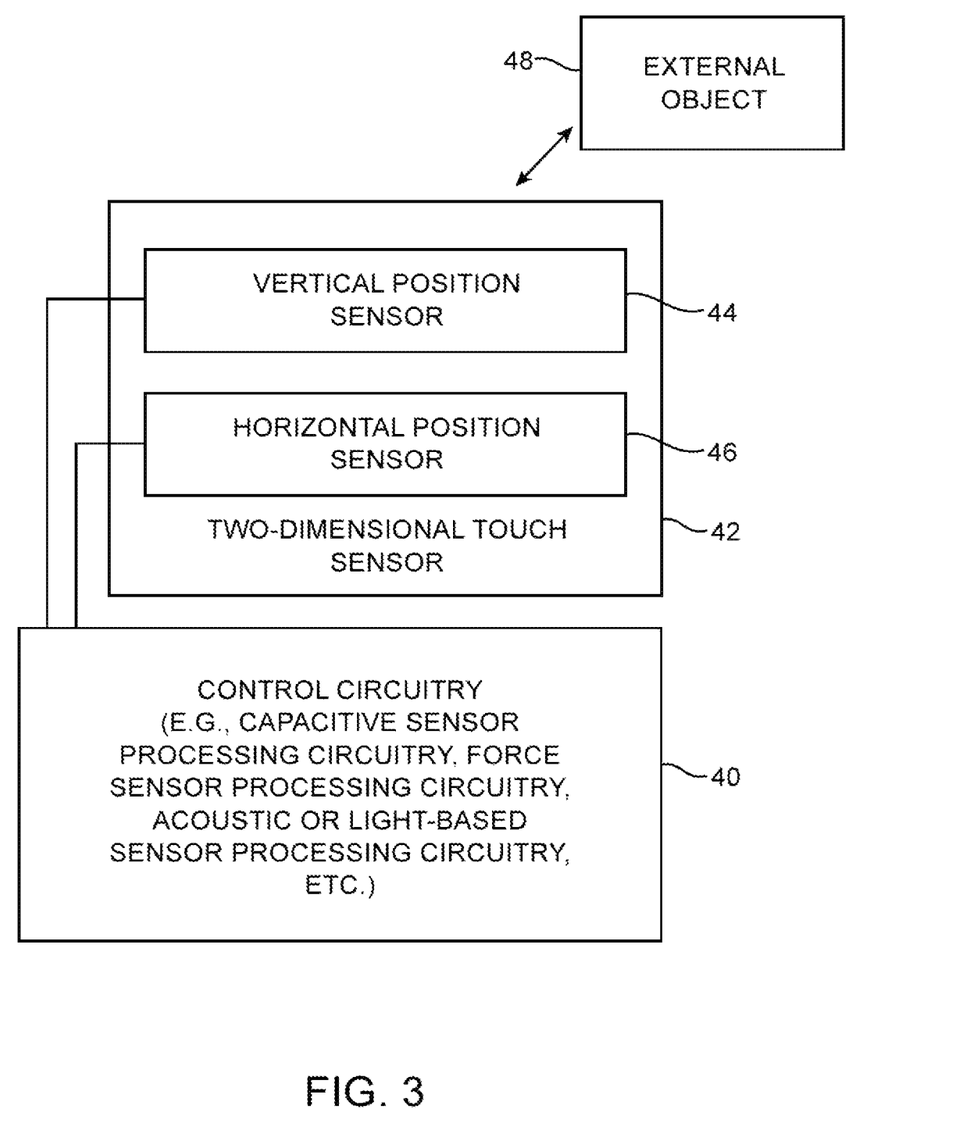
FIG. 3 is a diagram of a touch sensor measuring the position of an external object using vertical and horizontal touch sensor structures in accordance with an embodiment.

FIG. 3 is a diagram showing how touch sensor 42 (e.g., a touch sensor in display 14) may have horizontal position sensor structures such as horizontal position sensor 46 and vertical position sensor structures such as vertical position sensor 44. Horizontal position sensor 46 may be used to determine the location XH of touch point P of external object 48 on display 14 in horizontal dimension X. Vertical position sensor 44 may be used to determine the location YV of touch point P on display 14 in vertical dimension Y. Vertical position sensor 44 and horizontal position sensor 46 may be formed using different touch technologies. For example, horizontal position sensor 44 may be a capacitive touch sensor and vertical position sensor 44 may be a force-based, resistance based, acoustic, or light-based touch sensor (as examples).

Control circuitry 40 may contain processing circuitry for processing signals from vertical position sensor 44 and horizontal position sensor 46. For example, if horizontal position sensor 46 contains an array of indium tin oxide electrodes or other capacitive touch sensor electrodes, control circuitry 40 may contain capacitive touch sensor processing circuitry that produces horizontal touch position data based on capacitance readings from the electrodes. If vertical position sensor 44 contains force or resistance-based sensor structures (as examples), control circuitry 40 may contain circuitry for processing force or resistance data to generate vertical position information. In configurations in which vertical position sensor 44 contains light-based or acoustic touch sensor structures, control circuitry 40 may include circuitry that produces vertical position information from light readings or acoustic signals.

Vertical and horizontal position sensors 44 and 46 allow touch locations to be identified on display 14 in two lateral dimensions (X and Y), so touch sensor 42 may sometimes be referred to as a two-dimensional touch sensor. Vertical and horizontal position sensors 44 may use the same touch technology or may use distinct touch technologies.

Figure 4:
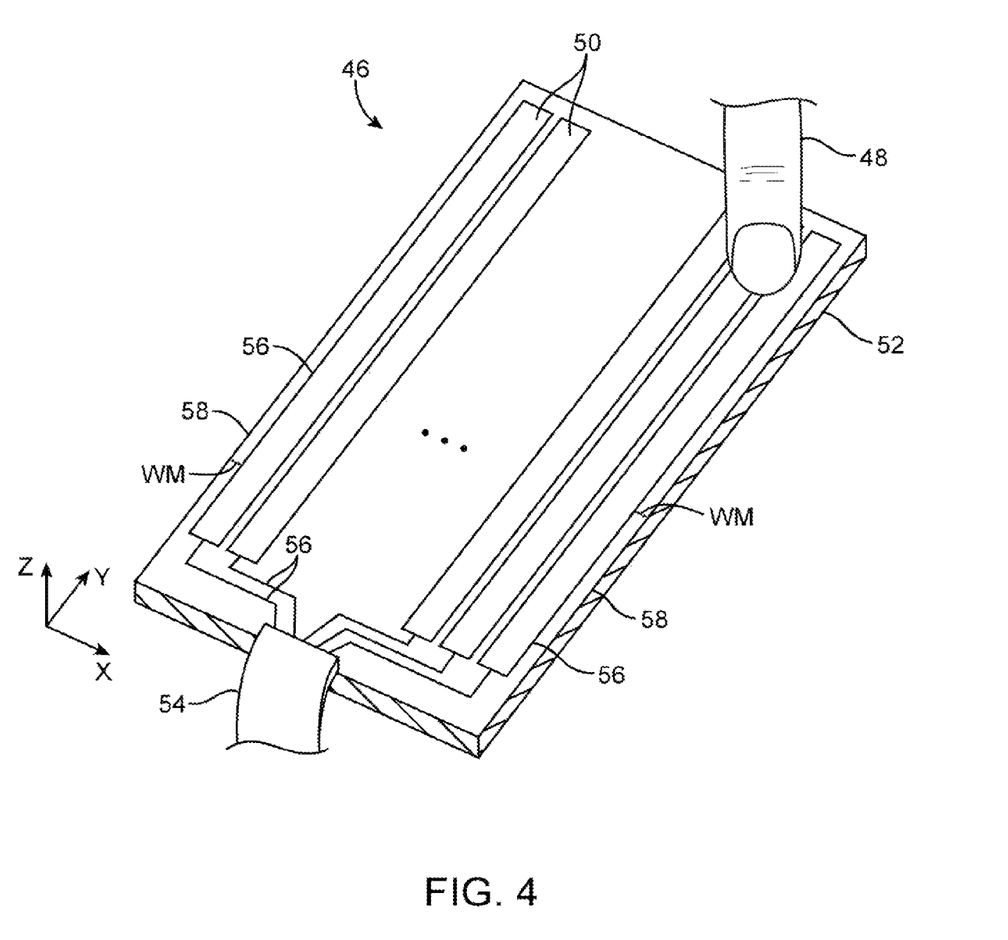
FIG. 4 is a perspective view of an illustrative capacitive touch sensor structure of the type that may be used as part of a two-dimensional touch sensor in accordance with an embodiment.

FIG. 4 is a perspective view of an illustrative horizontal position sensor based on columns of indium tin oxide that serve as horizontal position capacitive touch sensor electrodes 50. Electrodes 50 in horizontal position sensor 46 of FIG. 4 may be formed on transparent substrate (e.g., a layer of clear glass or plastic). Electrodes 50 may have elongated strip shapes that extend between the opposing upper and lower ends of substrate 52. Conductive materials such as indium tin oxide are transparent, which allows light from display 14 to pass through touch sensor 46.

Metal lines 56 may be used to route signals from respective capacitive touch sensor electrodes 50 to a cable such as flexible printed circuit cable 54. Cable 54 may be formed from a flexible printed circuit having metal traces on a layer of polyimide or a flexible sheet of other polymer substrate materials. Metal lines 56 may be formed from metals such as copper or aluminum (as examples). Metal lines 56 may potentially be unsightly to a user, so it is desirable to locate metal lines 56 in an inactive portion of display 14 (i.e., one of end regions 26 in inactive area IA under an opaque masking layer on a display cover layer).

In conventional two-dimensional capacitive touch sensors, metal lines that are used to gather vertical capacitive touch sensor data from horizontally extending electrodes are routed along the right and left edges of the touch sensor, thereby increasing the minimum possible width W of the left and right portions of the inactive area of the display. In an arrangement of the type shown in FIG. 4, in contrast, there is only minimal separation WM between outside edges 56 of indium tin oxide capacitive electrodes on the right and left sides of touch sensor 46 and the opposing edges 58 of touch sensor substrate layer 52, allowing width W of inactive region IA to be minimized.

Horizontal position sensor 46 of FIG. 4 is capable of determining the location of external object 48 in dimension X by processing the horizontal position sensor signals on electrodes 50 and signal lines 56 to identify which electrode structures in sensor 46 are being touched by external object 48. Because each electrode 50 extends the entire vertical length of sensor substrate 52, vertical position information is gathered using vertical position sensor 44, rather than horizontal position sensor 46.

Figure 5:
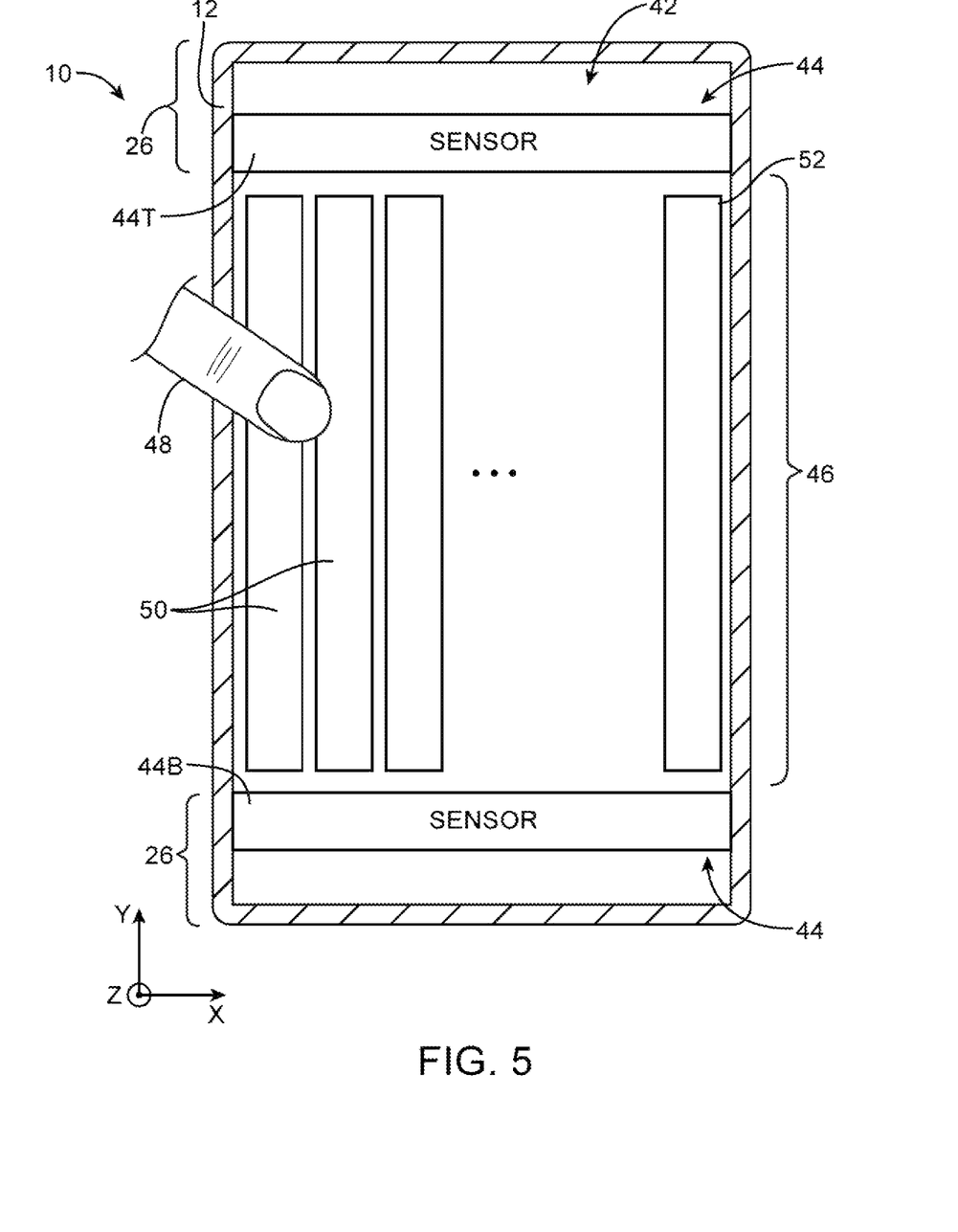
FIG. 5 is a top view of an electronic device with horizontal and vertical touch sensors that are used to form a two-dimensional touch sensor for a display in accordance with an embodiment.

FIG. 5 is a top view of an illustrative configuration for device 10 showing how touch sensor 42 in device 10 may have structures 44T and 44B for vertical position sensor 44. Structures 44T and 44B may be located at opposing ends of horizontal position sensor 46. Horizontal position sensor 46 may be a capacitive touch sensor of the type described in connection with FIG. 4 having transparent elongated capacitive electrodes 50 that extend parallel to vertical display dimension Y. Vertical position sensor 44 may be implemented using force-based touch sensor structures, resistive touch sensor technology, acoustic touch technology, light-based touch sensor structures, or touch sensors formed using other suitable technologies (e.g., a touch sensor technology different than the capacitive touch sensor technology used by horizontal touch sensor 46). With one suitable arrangement, upper sensor structure 44T and lower sensor 44B may make measurements that reveal the relative distances between object 48 and each of sensors 44T and 44.

Figure 6:
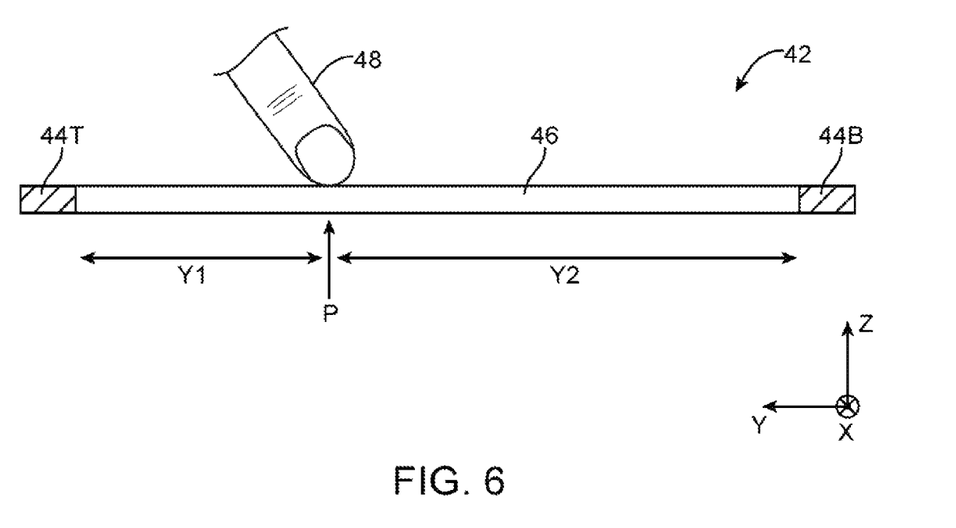
FIG. 6 is a cross-sectional side view of an illustrative two-dimensional touch sensor having vertical position sensor structures located at opposing ends of an elongated touch panel substrate on which capacitive horizontal position sensor structures have been formed in accordance with an embodiment.

Consider, as an example, the arrangement of FIG. 6 in which a user's finger or other external object 48 has contacted touch sensor 42 at a distance Y1 from upper touch sensor structure 44T and a distance Y2 from lower touch sensor structure 44B. Output signals from sensor structures 44T and 44B that are indicative of distances Y1 and Y2 can be processed by control circuitry 40 to determine the position of point P with respect to vertical dimension Y. For example, sensors 44T and 44B may be force sensors that measure how much force is being applied in direction –Z by external object 48. When external object 48 is located halfway between sensor structures 44T and 44B (i.e., when Y1 and Y2 are equal), the measured forces from force sensor structures 44T and 44B will be equal and control circuitry 40 can conclude that the vertical position of external object 48 is halfway between sensors 44T and 44B. When external object 48 is located closer to sensor structure 44T than sensor structure 44B, the force measurement made by sensor 44T will be larger than the force measurement made by sensor 44B. The values of Y1 and Y2 can be determined by comparing the sizes of the forces measured using sensor structures 44T and 44B.

The presence of force sensors 44T and 44B at opposing ends of sensor 46 therefore allows sensor 42 and control circuitry 40 to use interpolation or other signal processing techniques to determine the values of Y1 and Y2 based on force sensor measurements. Interpolation techniques of this type may also be used in resistance-based touch sensors, in acoustic touch sensors, in touch sensors based on light, etc. For example, in a light-based vertical touch sensor that includes an upper touch sensor 44T and a lower touch sensor 44B, sensors 44T and 44B may each emit light and measure corresponding reflected light signals. Control circuitry 40 can measure the relative strengths of the upper light sensor and the lower light sensor to determine the location of object 48 in vertical dimension Y. Similarly, in an acoustic or resistance-based touch sensor, upper and lower acoustic or resistance-based measurements can be interpolated to determine the vertical position of object 48.

If desired, vertical position sensor 44 can be implemented using vertical position sensor (touch sensor) structures that are located at only one end of horizontal position sensor 46. For example, a light-based, resistance-based, or force-based sensor can determine vertical location based on the strength of a light signal, resistance signal, or force signal that is gathered using only a sensor at the top (or bottom) of display 14 (e.g., by comparing the detected signal strength to predetermined signal strength values).

Force sensors may be implemented using structures that exhibit a change in resistance, capacitance, or inductance with compression such as resistive foam, piezoelectric force sensor structure, structures based on strain gauges, microelectromechanical systems (MEMS) force sensor structures, or other force sensor devices. As an example, force sensors such as sensors 44T and 44B of FIG. 5 may be implemented using strain gauges of the type shown in FIG. 7.

Figure 7:
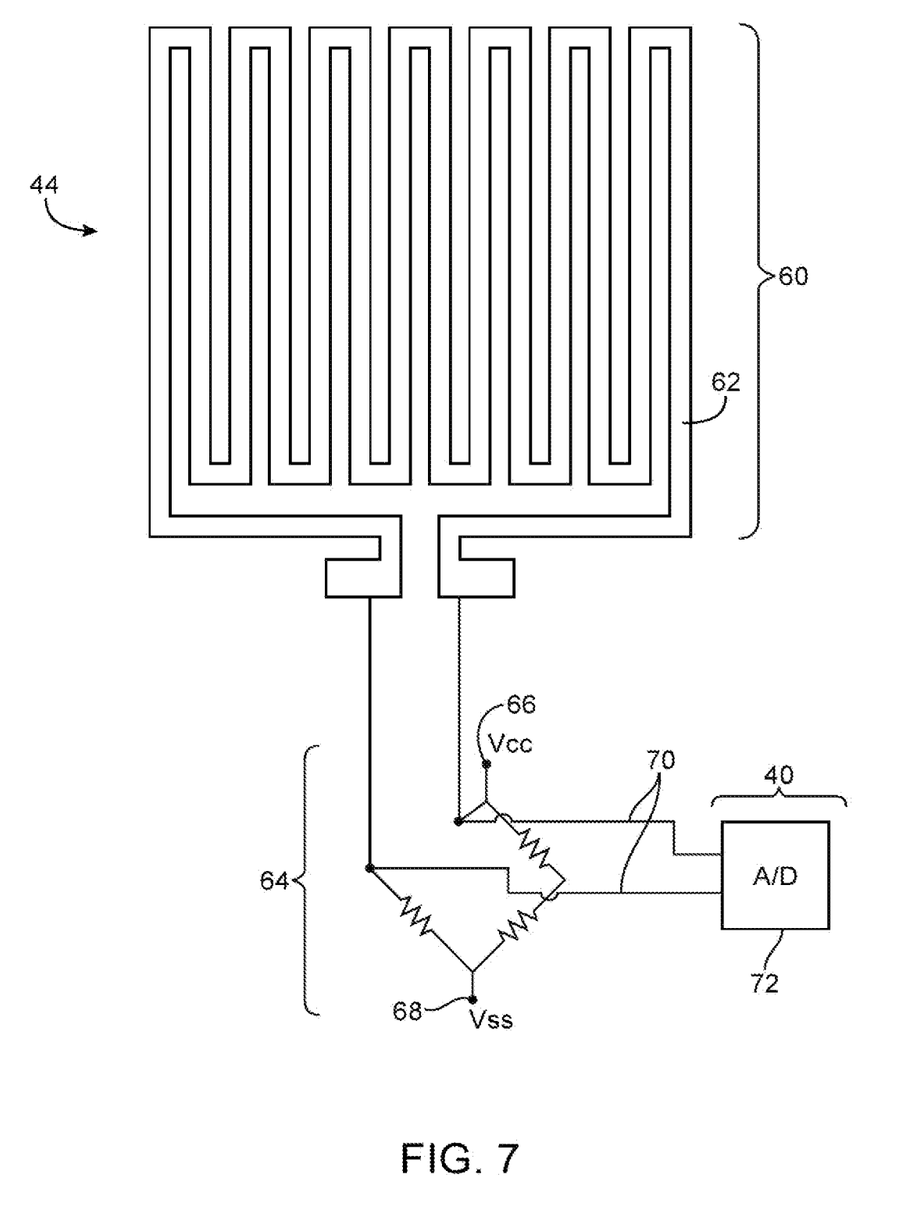
FIG. 7 is a diagram of an illustrative strain gauge that may be used in a touch sensor for forming vertical position sensor structures or other sensor structures in accordance with an embodiment.

As shown in FIG. 7, strain gauge 44G may have strain gauge resistor 60. When force is applied to resistor 60, strain will cause the meandering metal trace 62 in resistor 60 to deform, resulting in a change in the resistance of resistor 60. A measurement circuit such as bridge circuit 64 may be used to generate a signal proportional to the change in resistance of resistor 60. Bridge 64 may be powered with positive power supply Vcc at terminal 66 and ground power supply Vss at terminal 68 (as an example). Output signals proportional to the force applied to resistor 60 may be gathered using output terminals 70. Control circuitry 40 may use analog-to-digital converter 72 to gather resistance data from circuitry 64 (i.e., converter 72 may measure and digitize the voltage drop across resistor 60) and to process the gathered data to produce digital signals indicative of the amount of measured force for stain-gauge-based force sensor 44. Sensor structures 44T and 44B may each have one or more resistors such as resistor 60 and corresponding measurement circuitry.

Figure 8:
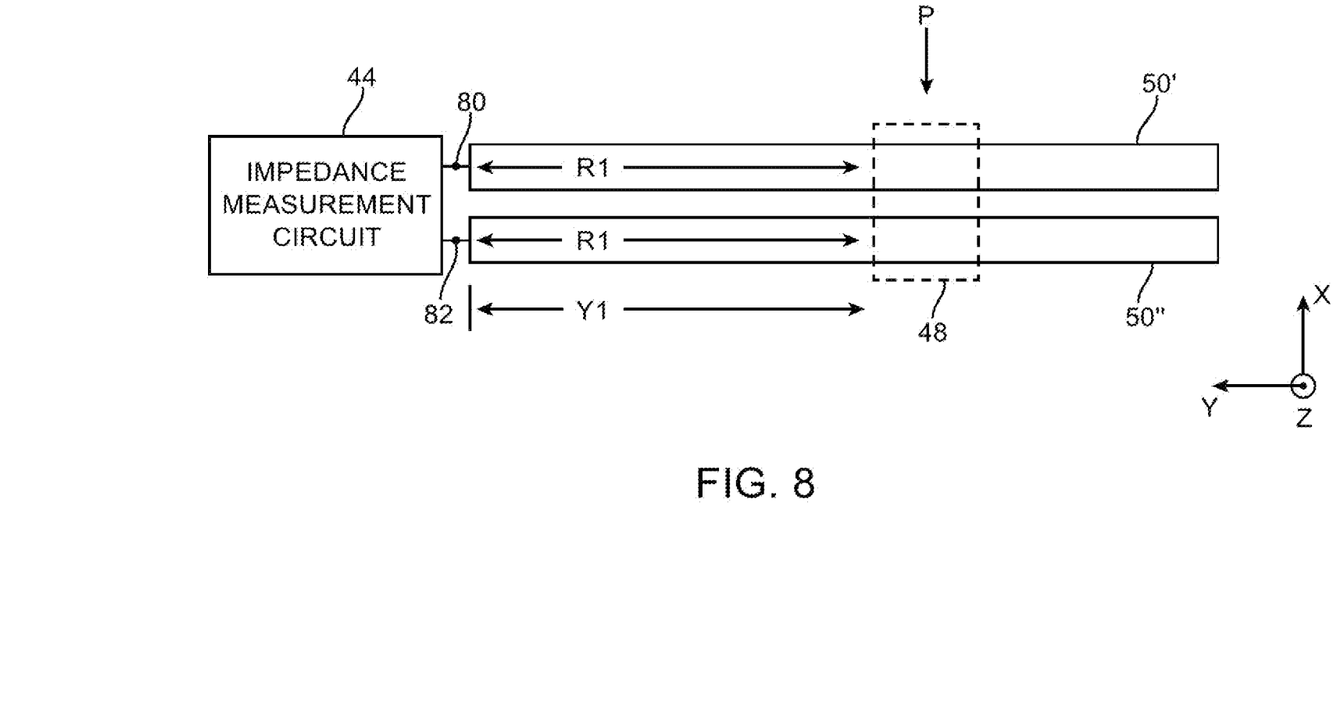
FIG. 8 is a top view of a portion of a capacitive touch sensor in a horizontal position sensor that is being used to make resistance-based measurements for a vertical position sensor in accordance with an embodiment.

If desired, resistance-based (impedance-based) measurements may be made by vertical position sensor 44 to determine the vertical location of touch input P. As shown in FIG. 8, impedance measurements may be made on indium tin oxide capacitive electrodes such as electrodes 50' and 50" using impedance measurement circuitry 44. Electrodes 50' and 50" of FIG. 8 may be a pair of adjacent electrodes 50 in horizontal position sensor 46 (FIG. 5). When a user touches electrodes 50' and 50" at location P, the user's finger 48 will capacitively couple electrodes 50' and 50" together, thereby forming a low-impedance bridging path between electrodes 50' and 50" at location P. In this situation, impedance measurement circuit 44 will measure the impedance between terminals 80 and 82 as being equal to about 2*R1, where R1 is the resistance of the electrodes over a distance Y1. Based on the impedance measurement of 2*R1 that is gathered using circuitry 44, circuitry 44 can determine the value of Y1 (i.e., the vertical position of point P along dimension Y). Impedance measurement circuitry 44 and horizontal position sensor electrodes 50' and 50" may therefore be used in forming a vertical position sensor. The use of a resistance-based vertical position sensor such as the vertical position sensor of FIG. 8 may help eliminate the need for signal lines running along the right and left edges of touch sensor 42.

Figure 9:
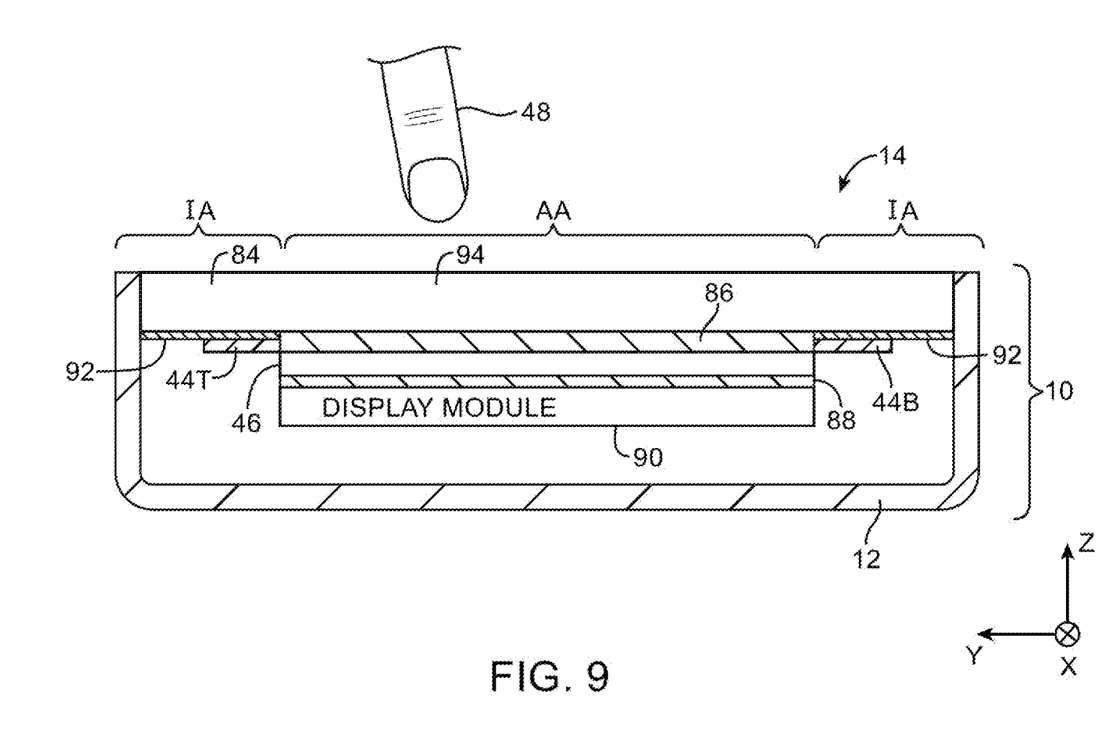
FIG. 9 is a cross-sectional side view of an illustrative electronic device having touch sensor structures attached to the underside of a display cover layer using adhesive in accordance with an embodiment.

FIG. 9 is a cross-sectional side view of device 10 in a configuration in which display 14 has been provided with a transparent display cover layer such as display cover layer 84. Display cover layer 84 may be mounted in a device housing such as electronic device housing 12. Display cover layer 84 may be provided with opaque masking layer 92 in inactive areas IA at the upper and lower ends of device 10. Force sensors structures 44T and 44B for vertical position sensor 44 may be formed on the underside of display cover layer 84 (e.g., on the underside of opaque masking material 92). Force sensor structures 44T and 44B may be, for example, strain gauges such as the strain gauge of FIG. 7. When a user presses a finger or other external object 48 against upper surface 94 of display cover layer 84, display cover layer 84 will locally flex (e.g., by a small amount that may not even be perceptible to the user). Strain gauge force sensors 44T and 44B may measure the amount of force that finger 48 is applying to surface 94 of display cover layer 84 in downward direction −Z. Interpolation or other signal processing techniques may then be used by control circuitry 40 to determine the vertical position of finger 48 on display 14.

The horizontal position of finger 48 of FIG. 9 may be determined using horizontal position sensor 46. Adhesive 86 may be used to attach horizontal position sensor 46 to the underside of display cover layer 84. Adhesive layer 88 may be used to attach display module 90 to the underside of horizontal touch sensor 46. Display module 90 may include an array of display pixels 22 (e.g., liquid crystal display pixels, organic light-emitting-diode display pixels, etc.).

Figure 10:
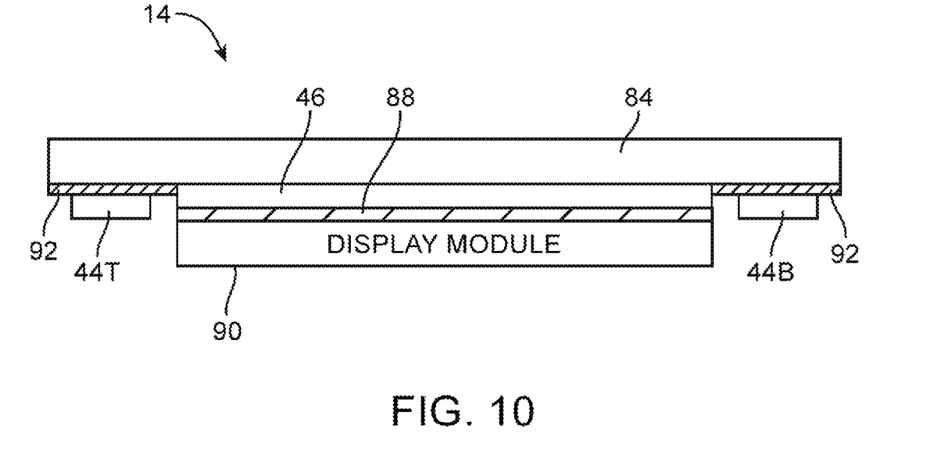
FIG. 10 is a cross-sectional side view of an illustrative electronic device having touch sensor structures formed using a pattern of transparent capacitive sensor electrodes on the underside of a display cover layer in accordance with an embodiment.

In the illustrative arrangement of FIG. 10, horizontal position sensor 46 (e.g., the elongated indium tin oxide traces for forming electrodes 50 in horizontal position sensor 46) may be formed directly on the underside of display cover layer 84. Display module may be mounted to horizontal position sensor 46 using adhesive 88.

The amount of power consumed by touch sensor 42 may be reduced by deactivating part of touch sensor 42 when that part of the touch sensor is not being actively used. As an example, if device 10 is directed by the user to enter a low power sleep state or if a period of inactivity has passed that indicates that a sleep state should be entered, device 10 may enter a sleep state to conserve power. During the sleep state, it is not necessary to power display pixels 22 in display module 90, so the display pixel portion of display 14 may be temporarily disabled. It is also not necessary to gather touch input data in both the horizontal and vertical dimensions, because the user is not actively using touch sensor 42 to interact with content on display 14. If desired, vertical position sensor 44 may be maintained in an enabled state to monitor for touch events on the display, while horizontal position sensor 46 is disabled to conserve power.

With sensor 46 off and sensor 44 on, sensor 44 can monitor for input indicative of a command to awaken from sleep mode. If sensor 44 detects a force from external object 48 that exceeds a predetermined threshold, control circuitry 40 can enable horizontal position sensor 46 so that touch sensor 42 is fully activated. Display pixels 22 can also be turned on. If sensor 44 does not detect a force from an external object, control circuitry 40 can maintain device 10 in a low power sleep state. The use of vertical position sensor 44 to monitor for wake touch commands may conserve power, because horizontal position information is not required during the process of monitoring for wake commands.

Figure 11:
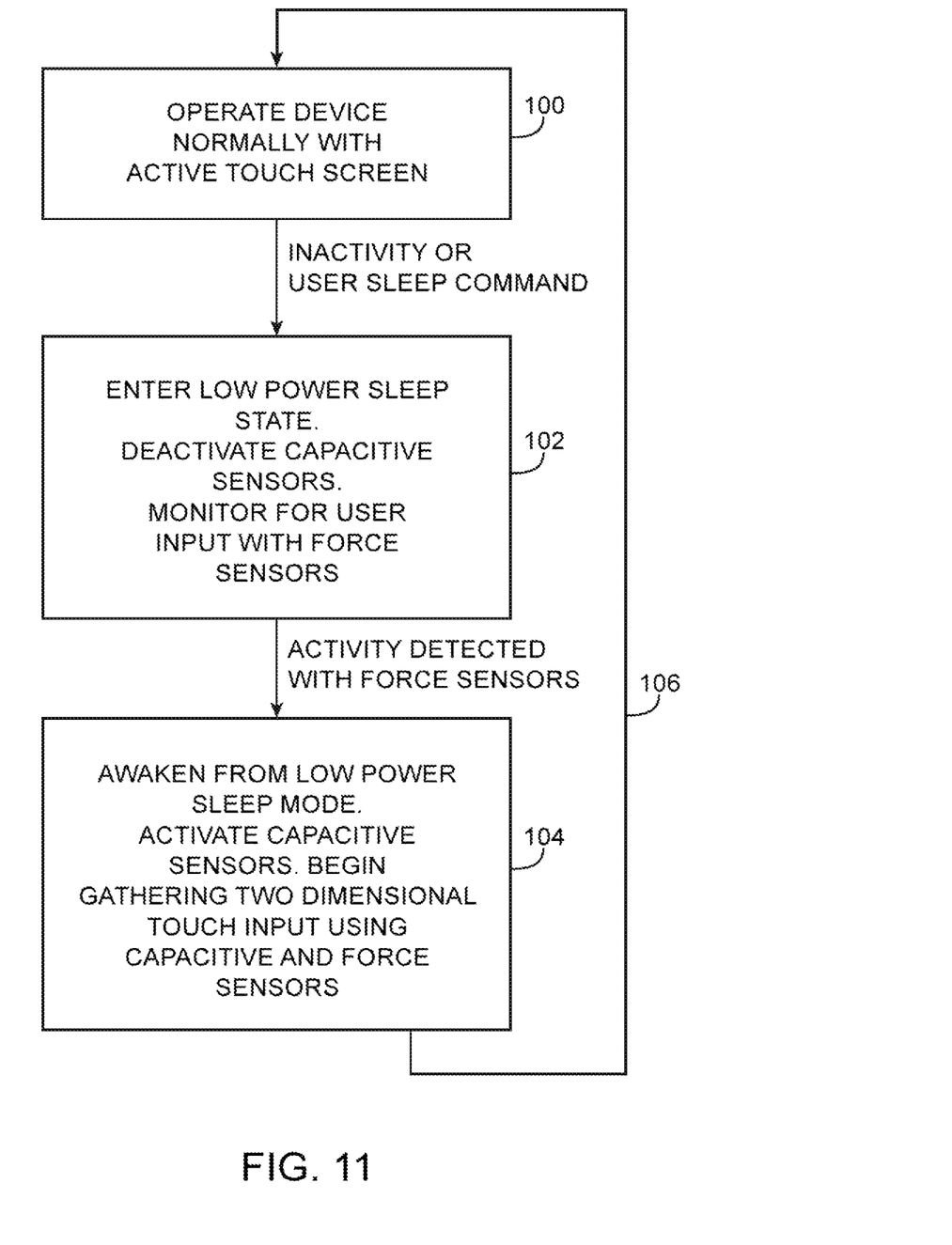
FIG. 11 is a flow chart of illustrative steps involved in operating an electronic device having a two-dimensional touch sensor in accordance with an embodiment.

FIG. 11 is a flow chart of illustrative steps involved in operating device 10 using touch screen display 14.

At step 100, a user of device 10 may operate device 10 normally. During normal operation, device 10 may be fully powered. A user may enter touch input using two-dimensional touch sensor 42. Horizontal touch location information can be gathered using horizontal position sensor 46. Vertical touch location information can be gathered using vertical position sensor 44. Input-output circuitry 32 such as button 16, other buttons, touch sensor 42 and other devices in electronic device 10 may be monitored for periods of activity and/or for commands from a user to enter a sleep state.

Upon reaching the expiration of an inactivity timeout period or upon receipt of a sleep command from a user, device 10 may enter a low power sleep state (step 102). In the sleep state, display pixels 22 in display 14 may be turned off to conserve power (as an example). Part of touch sensor 42 may also be turned off (disabled) to conserve power. For example, horizontal position sensor 46 may be disabled to conserve power. Vertical position sensor 44 may be maintained in an active state to monitor for subsequent wake-up commands.

In response to detection of touch input using vertical position sensor 44 (e.g., a force sensor, resistance sensor, etc.), control circuitry 40 may awaken device 10 from the low power sleep state (step 104). For example, control circuitry 30 can activate capacitive touch sensor circuitry in horizontal position sensor 46 so that two-dimensional touch sensor 42 is fully active. The display pixels in display 14 may also be turned on to display information for the user. As indicated by line 106, once awakened, device 10 may be operated normally (step 100).

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device that receives touch input from an external object, comprising:
   a housing; and
   a touch screen display in the housing, wherein the touch screen display has a two-dimensional touch sensor that determines a touch contact point between the external object and the touch screen display, wherein the two-dimensional touch sensor has a first position sensor that determines a first position of the touch contact point along a first axis and a second position sensor that determines a second position of the touch contact point along a second axis, wherein the first axis is perpendicular to the second axis, wherein the first position sensor comprises a capacitive touch sensor comprising capacitive electrodes that extend along the second axis, wherein the second position sensor is a non-capacitive touch sensor comprising conductive structures that extend along the first axis, and wherein the capacitive electrodes and the conductive structures do not overlap.

2. The electronic device defined in claim 1 wherein the second position sensor comprises a force sensor.

3. The electronic device defined in claim 2 wherein the conductive structures include upper force sensor structures and lower force sensor structures located on opposing ends of the first position sensor.

4. The electronic device defined in claim 3 further comprising a display cover layer in the housing that overlaps the touch screen display, wherein the upper force sensor structures comprise a first strain gauge on an inner surface of the display cover layer, and wherein the lower force sensor structures comprise a second strain gauge on the inner surface of the display cover layer.

5. The electronic device defined in claim 4 wherein the first position sensor has a substrate with first and second ends, and wherein the capacitive electrodes comprise a plurality of parallel elongated transparent capacitive electrodes that extend between the first and second ends.

6. The electronic device defined in claim 1 wherein the second position sensor comprises a resistance-based sensor.

7. The electronic device defined in claim 6 wherein the first position sensor has a substrate with first and second ends, wherein the capacitive electrodes comprise a plurality of elongated transparent conductive electrodes that extend between the first and second ends and wherein the second position sensor comprises impedance measurement circuitry coupled to the elongated transparent conductive electrodes.

8. The electronic device defined in claim 1 further comprising:
a display cover layer that overlaps the touch screen display; and
an opaque masking layer on an inner surface of the display cover layer, wherein the second position sensor includes at least one force sensor on the opaque masking layer.

9. The electronic device defined in claim 1 wherein the second position sensor comprises an acoustic sensor.

10. The electronic device defined in claim 1 wherein the second position sensor comprises a light-based sensor.

11. The electronic device defined in claim 1 wherein the first position sensor is a horizontal position sensor and the second position sensor is a vertical position sensor.

12. An electronic device configured to receive touch input from an external object, comprising:
a display module;
a display cover layer that overlaps the display module, wherein the display cover layer has a rectangular periphery with first and second sets of opposing edges;
an opaque masking layer on the display cover layer along a portion of the rectangular periphery;
a horizontal position sensor that determines a horizontal position on the display cover layer associated with the touch input; and
a vertical position sensor that determines a vertical position on the display cover layer associated with the touch input, wherein the horizontal and vertical position sensors are based on distinct touch sensor technologies, wherein the opaque masking layer is formed on the display cover layer over the vertical position sensor along the first set of opposing edges, and wherein the display cover layer is free of the opaque masking layer along the second set of opposing edges.

13. The electronic device defined in claim 12 wherein one of the horizontal and vertical position sensors comprises a capacitive touch sensor having a substrate and a plurality of elongated parallel transparent conductive capacitive electrodes.

14. The electronic device defined in claim 13 wherein the horizontal position sensor comprises the capacitive touch sensor and wherein the vertical position sensor comprises a force sensor.

15. The electronic device defined in claim 14 wherein the force sensor is mounted to a surface of the display cover layer.

16. The electronic device defined in claim 15 wherein the display module is attached to the horizontal position sensor with a first layer of adhesive and wherein the horizontal position sensor is attached to the display cover layer with a second layer of adhesive.

17. The electronic device defined in claim 12 wherein one of the horizontal and vertical position sensors comprises a capacitive touch sensor having a plurality of elongated parallel transparent conductive capacitive electrodes formed on a surface of the display cover layer.

18. The electronic device defined in claim 17 further comprising a rectangular housing having top, bottom, left, and right edges, wherein the horizontal position sensor includes the elongated parallel transparent conductive capacitive electrodes and wherein the elongated parallel transparent conductive capacitive electrodes extend vertically parallel to left and right edges of the rectangular housing.

19. A touch sensor display that has an active area surrounded by an inactive area and that is operable in response to a touch by an external object, comprising:
a display pixel array that emits light in the active area of the touch sensor display;
a force sensor that measures a position of the touch on the touch sensor display with respect to a first lateral dimension without measuring a position of the touch on the touch sensor display with respect to a second lateral dimension that is perpendicular to the first lateral dimension, wherein the force sensor is formed in the inactive area of the touch sensor display; and
a capacitive sensor that measures the position of the touch on the touch sensor display with respect to the second lateral dimension without measuring the position of the touch on the touch sensor display with respect to the first lateral dimension.

20. The touch sensor display defined in claim 19 wherein the capacitive sensor comprises a plurality of elongated transparent conductive capacitive electrodes each of which extends across the display pixel array.

21. The touch sensor defined in claim 20 further comprising a display cover layer, wherein the force sensor comprises a strain gauge on the display cover layer and wherein the plurality of elongated transparent conductive capacitive electrodes are formed on the display cover layer.

* * * * *